United States Patent

Chaya

Patent Number: 5,590,095
Date of Patent: Dec. 31, 1996

[54] MAGNETO-OPTICAL DISK APPARATUS WITH FLOATING TYPE MAGNETIC HEAD AND A DEVICE FOR LIMITING AN AMOUNT OF DEFLECTION OF A RESILIENT MEMBER SUPPORTING THE MAGNETIC HEAD

[75] Inventor: Masahiko Chaya, Yokohama, Japan

[73] Assignee: Canon Kabushiki Kaisha, Tokyo, Japan

[21] Appl. No.: 295,141

[22] Filed: Aug. 24, 1994

Related U.S. Application Data

[63] Continuation of Ser. No. 936,502, Aug. 28, 1992, abandoned.

[30] Foreign Application Priority Data

Aug. 30, 1991 [JP] Japan ................. 3-244154
Oct. 25, 1991 [JP] Japan ................. 3-305710

[51] Int. Cl.⁶ .............. G11B 7/00; G11B 5/54; G11B 17/00
[52] U.S. Cl. .............. 369/13; 360/105; 369/244
[58] Field of Search .............. 360/103, 114, 360/105, 106; 369/13, 257, 244

[56] References Cited

U.S. PATENT DOCUMENTS

| | | | |
|---|---|---|---|
| 3,788,648 | 1/1974 | Kawci | 369/257 |
| 4,554,653 | 11/1985 | Malissin et al. | 369/45 |
| 4,605,979 | 8/1986 | Inoue et al. | 360/105 |
| 4,613,962 | 9/1986 | Inoue et al. | 369/44 |
| 4,651,245 | 3/1987 | Kanno | 360/105 |
| 4,684,913 | 8/1987 | Yaeger | 360/105 |
| 4,722,012 | 1/1988 | Toldi et al. | 360/105 |
| 4,724,500 | 2/1988 | Dalziel | 360/104 |
| 4,742,410 | 5/1988 | Smith | 360/105 |
| 4,777,551 | 10/1988 | Seki et al. | 360/104 |
| 4,798,447 | 1/1989 | Jansen et al. | 350/255 |
| 4,829,396 | 5/1989 | Okutsu | 360/105 |
| 4,875,119 | 10/1989 | Ando et al. | 360/105 |
| 4,999,725 | 3/1991 | Takahashi | 360/105 |
| 5,006,946 | 4/1991 | Matsuzaki | 360/105 |
| 5,057,954 | 10/1991 | O'Sullivan | 360/105 |
| 5,068,841 | 11/1991 | Nakayama et al. | 369/13 |
| 5,072,431 | 12/1991 | Ohmori et al. | 360/114 X |
| 5,122,998 | 6/1992 | Mizuno et al. | 369/13 |
| 5,124,965 | 6/1992 | Mizuno et al. | 369/44.22 |
| 5,223,999 | 6/1993 | Suzuki | 360/105 |
| 5,291,361 | 3/1994 | Yokota | 360/106 |
| 5,313,445 | 5/1994 | Wada et al. | 360/105 |
| 5,333,085 | 7/1994 | Prentice et al. | 360/104 |

FOREIGN PATENT DOCUMENTS

| | | |
|---|---|---|
| 0342625 | 11/1989 | European Pat. Off. . |
| 0350225 | 1/1990 | European Pat. Off. . |
| 0403266 | 12/1990 | European Pat. Off. . |
| 8801780 | 2/1985 | Japan . |
| 60-25073 | 3/1988 | WIPO . |

OTHER PUBLICATIONS

Patent Abstracts of Japan, Kokai No. 57–110069, vol. 6, No. 200, Oct. 1982.

*Primary Examiner*—Stuart S. Levy
*Assistant Examiner*—Brian E. Miller
*Attorney, Agent, or Firm*—Fitzpatrick, Cella, Harper & Scinto

[57] ABSTRACT

Disclosed is magnetoptical disc apparatus for recording information in magnetoptical recording medium using a floating type magnetic head. The apparatus includes a floating type magnetic head for applying a modulated magnetic field to the medium, a leaf spring for supporting the magnetic head floatably above the medium, a retreating mechanism for moving the magnetic head from a position at which the magnetic head can contact the medium and a limiting device for limiting a deflection of the leaf spring when the retreating mechanism moves the magnetic head from the above-mentioned position. The driving stroke needed for moving the magnetic head can be reduced, and as a result, the retreating mechanism can be made small in size.

25 Claims, 7 Drawing Sheets

FIG.5B FIG.5B'

MAGNETO-OPTICAL DISK APPARATUS WITH FLOATING TYPE MAGNETIC HEAD AND A DEVICE FOR LIMITING AN AMOUNT OF DEFLECTION OF A RESILIENT MEMBER SUPPORTING THE MAGNETIC HEAD

This application is a continuation of prior application, Ser. No. 07/936,502 filed Aug. 28, 1992, now abandoned.

BACKGROUND OF THE INVENTION

1. Field of the Invention

The present invention relates to an optomagnetic (magneto-optical) disc apparatus which is capable of erasing and writing information on an optomagnetic (magneto-optical) disc, and in particular, to an optomagnetic (magneto-optical) disc apparatus which is capable of effecting so-called overwriting by the modulation of a magnetic field using a floating type magnetic head.

2. Related Background Art

In general, conventional magnetic-field modulation type optomagnetic disc apparatuses are provided with an optical pick-up 100, a magnetic head 11 and a mechanism for retreating or removing the magnetic head 11 from its operative position, as is shown in FIG. 1. In this optomagnetic disc apparatus, an optomagnetic disc 105 having an optomagnetic medium layer and a protective layer formed on a transparent substrate and contained in a disc cartridge 106 can be loaded onto a turn-table (not shown). Below the loaded disc 105, namely, at tile transparent substrate side of the disc 105, the optical pick-up 100 mounted on a carriage 103 is arranged, and above the loaded disc 105, namely, at the protective layer side of the disc 105, the magnetic head 11 mounted on the carriage 103 is disposed at a position opposite to an opened shutter portion of the disc cartridge 106. At this position the magnetic head 11 is also located opposite to an objective lens of the optical pick-up 100.

The carriage 103 is movably supported by bearings 101 and so forth along a slide guide (not shown) that extends in a radial direction of the optomagnetic disc 105. The carriage 103 can be moved by a linear motor 102 along a track extending in the direction of the optomagnetic disc 105.

In the structure of the floating type slider for supporting the magnetic head 11, a leaf spring 10 that acts as a load beam is mounted to an intermediate member 12 and the magnetic head 11 is fixed to a tip portion of the leaf spring 10. The intermediate member 12 can be pivotally supported by the optomagnetic head carriage 103 through a shaft 13 as shown in FIG. 1, or the intermediate member 12 can be movably supported in the upward and downward directions by a magnetic head carriage 210 which can be moved independently of the optomagnetic head carriage 103 as shown in FIG. 2.

The magnetic head 11 is moved upward by a retreating means when the disc cartridge 106 is being loaded or unloaded. In the structure of FIG. 1, the leaf spring 10 and the magnetic head 11 are moved by moving a guide roller 15, located on the intermediate-member 12, upward or downward using a solenoid mechanism (not shown) or the like.

The leaf spring 10 functions to resiliently push the magnetic head 11 against the disc 105, and its spring constant is set to a small value to reduce the fluctuation of the spring force or pushing force due to the surface fluctuation of the disc 105. Therefore, the amount of deformation (i-e., the amount of the push) of the leaf spring 10 itself needed to generate a desired spring force is set to about 2–4 mm. Thus, in order to bring the magnetic head 11 from a free state (a state in which the magnetic head 11 is apart from the disc surface) to the above-mentioned pushing state, the leaf spring 10 must be pushed in the spring force direction by about 2–4 mm after the floated surface of the magnetic head 11 comes in contact with the surface of the disc 105.

In the above structure, when the magnetic head 11 is to be moved away from the disc cartridge 106, the intermediate member 12 is rotated about the shaft 13 by pushing down the guide roller 15 In the case of the structure shown in FIG. 2, a guide roller 15 is elevated to move the magnetic head 11. At this time, the leaf spring 10 in the retreated position is deflected towards the disc 105 by a predetermined amount $\Delta h$ due to the weight of the leaf spring 10 and the magnetic head 11. Therefore, determination of a rotation angle $\theta_b$ of the intermediate member 12 and a stroke amount b of the movement of the guide roller 15 must account for the amount $\Delta h$ of the deflection of the leaf spring 10. Thus, when the magnetic head 11 is moved away from the surface of the disc 105 by a distance h, the stroke amount b of the movement of the guide roller 15 effected by the solenoid, etc., becomes larger by an amount corresponding to the amount of the deflection $\Delta h$ of the leaf spring 10. This results in a need for a large-sized mechanism which includes the solenoid.

SUMMARY OF THE INVENTION

It is an object of the present invention to provide an optomagnetic disc apparatus which does not need a large-sized magnetic-head retreating mechanism.

According to one aspect of the present invention, an optomagnetic disc apparatus for achieving the above object effects recording of information in an optomagnetic recording medium using a floating type magnetic head and includes the magnetic head, a leaf spring for supporting the magnetic head in a floatable manner, a retreating device for moving the magnetic head away from the medium and a limiting device for controlling the deflection of the leaf spring to be generated when the magnetic head is moved away by the retreating device.

According to another aspect of the present invention, an apparatus for recording information on a recording medium is provided which includes a recording means and a support means for supporting the recording means. A moving means moves the support means to transfer the recording means between an operative position and a raised position, and a limiting means limits the amount of deflection of the support means when the recording means is in the raised position.

These advantages and others will be more readily understood in connection with the following detailed description of the preferred embodiments in conjunction with the drawings.

BRIEF DESCRIPTION OF THE DRAWINGS

FIGS. 5B and 5C are respectively side views showing operations of the apparatus shown in FIG. 5A FIG. 5B' shows an enlarged view of a portion of FIG. 5B.

DESCRIPTION OF THE PREFERRED EMBODIMENT

Figure 1:
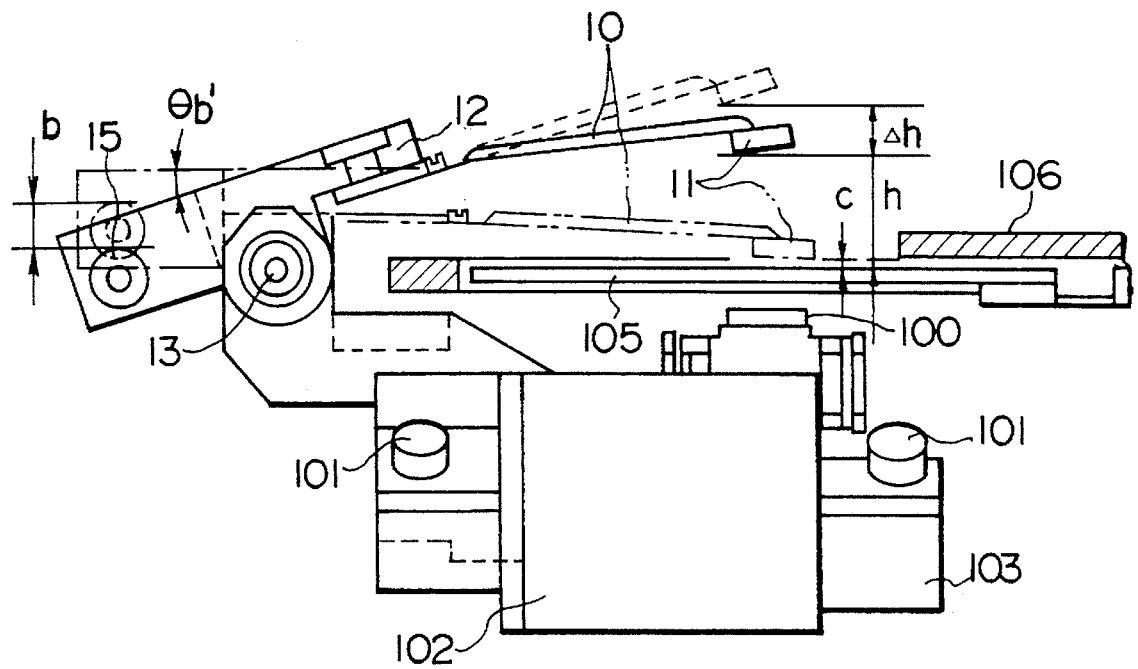
FIG. 1 is a side view showing the structure of a prior art optomagnetic disc apparatus.
Figure 2:
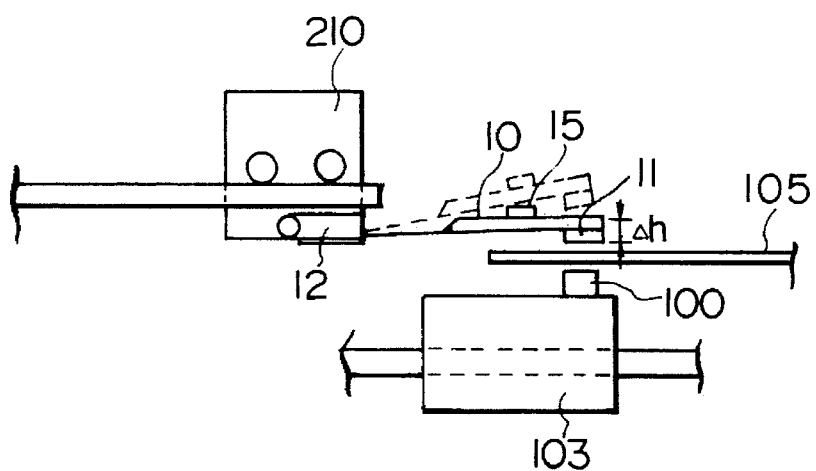
FIG. 2 is a side view showing the structure of another prior art optomagnetic disc apparatus.
Figure 3:
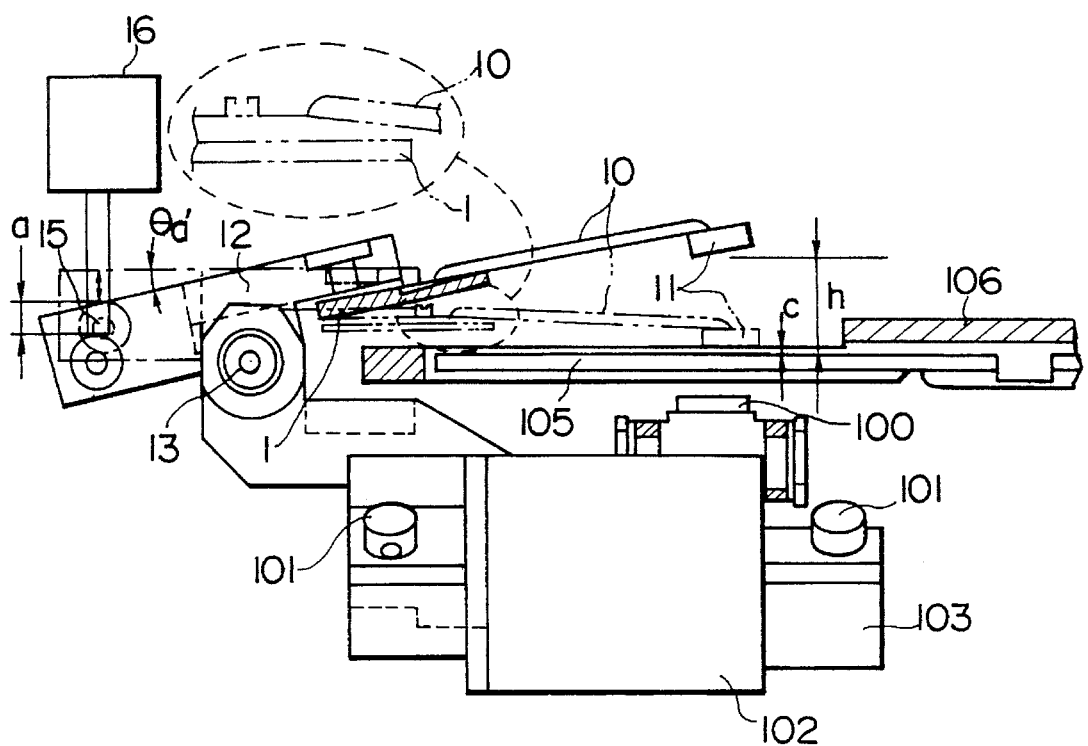
FIG. 3 is a side view showing the structure of a first preferred embodiment of an optomagnetic disc apparatus according to the present invention.

The first embodiment of the present invention will be explained with reference to FIGS. 3, 4A, 4B, 4C and 4D. FIG. 3 shows a case where a magnetic head 11 for modulating a magnetic field performs a seeking operation together with an optical pick-up 100. In FIG. 3, the same members or portions as those of the prior art apparatus shown in FIG. 1 are designated by the same reference numerals, and the explanation thereof will be omitted.

In the first embodiment a preload or limiting member 1 is fixed to an intermediate member 12. The limiting member 1 is disposed at the side of a disc. 105 facing a leaf spring 10, and one end of the limiting member 1 (a free end) is extended towards a tip portion of the leaf spring 10 while the other end thereof is fixed to the intermediate member 12. The free end of the limiting member 1 is not in contact with the leaf spring 10 when the magnetic head 11 is in contact with the surface of the disc 105 (when the disc 105 is not rotated) or when the magnetic head 11 is floated above the disc 105 (when the disc 105 rotates).

In the above structure, if the disc 105 is rotated, an air flow accompanying the rotation of the disc 105 acts on a floating slider and the magnetic head 11 is maintained in a floating state approximately within a predetermined clearance above the disc surface. When a disc cartridge 106 is being loaded or unloaded, it is necessary to move the magnetic head 11 upward by a retreat distance h so that the disc cartridge 106 will not touch the leaf spring 10 and the magnetic head 11. This movement is achieved by raising a guide roller 15 using a driving means such as a solenoid 16.

In a first preferred embodiment, when the leaf spring 10 begins to be deflected due to the weight of the leaf spring 1B and the magnetic head 11 at the time of the retreat operation, the lower surface of the leaf spring 10 will quickly be brought into contact with the tip portion of the limiting member 1 and a further deflection of the leaf spring 10 is limited by the preload or limiting member 1. Therefore, even if the rotation angle $\theta_a$' of the intermediate member 12 about a shaft 13 is smaller than $\theta_b$' (see FIG. 1), the magnetic head 11 can be retreated by the same distance h as that of the prior art apparatus. Thus, the stroke amount a of downward movement of the guide roller 15 can be decreased (a<b), and the mechanism for driving the guide roller 15 can be made small in size.

Figure 4A:
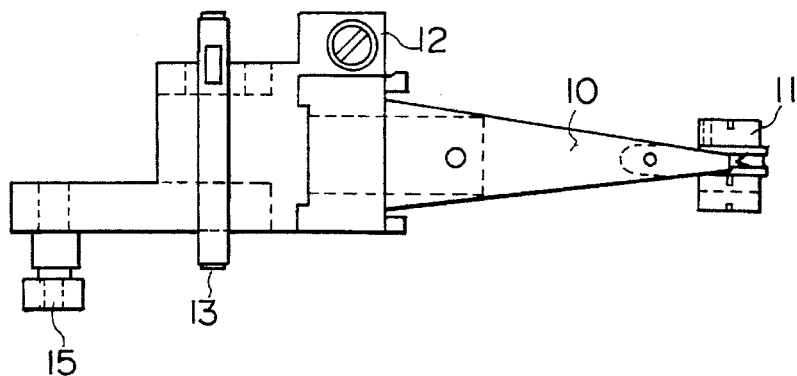
FIGS. 4A and 4B are respectively plan and side views of a modified preload or limiting member of the apparatus shown in FIG. 3.
Figure 4B:
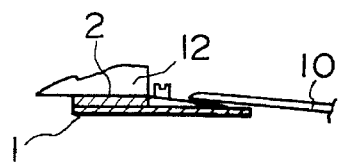
Figure 4C:
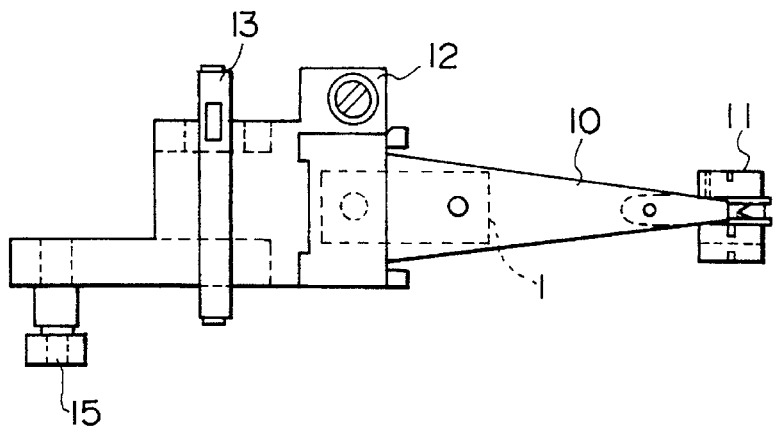
FIGS. 4C and 4D are respectively plan and side views of another modified preload or limiting member of the apparatus shown in FIG. 3.
Figure 4D:
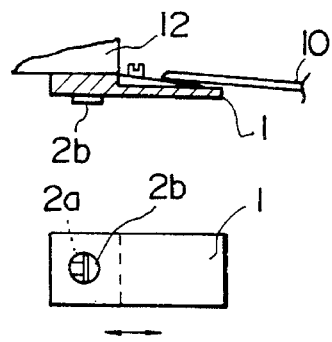

A plan view and side view of a modified structure are shown in FIGS. 4A and 4B, respectively. In the modified structure, the limiting member 1 is attached to the intermediate member 12 through a spacer 2 as shown in FIG. 4B. Thus, the clearance between the leaf spring 10 and the limiting member 1 in the non-contact state in which the magnetic head 11 abuts the disc 105 can be adjusted. A plan view and side view of a structure in which the clearance can be adjusted are shown in FIGS. 4C and 4D, respectively. The clearance may be adjusted in the following manner. Namely, an oblong hole 2a extending in the longitudinal direction is formed in the limiting member 1, a screw 2b is threaded into the oblong hole 2a and the limiting member 1 is attached to the leaf spring 10 in an adjusted position in the longitudinal direction as shown in FIG. 4D. Thus, the position of the leaf spring 10 at which the tip portion of the limiting member 1 can touch the leaf spring 10 can be changed.

In the above structures, the solenoid mechanism of the retreating means for the magnetic head 11, etc., can be made compact in size.

Figure 5A:
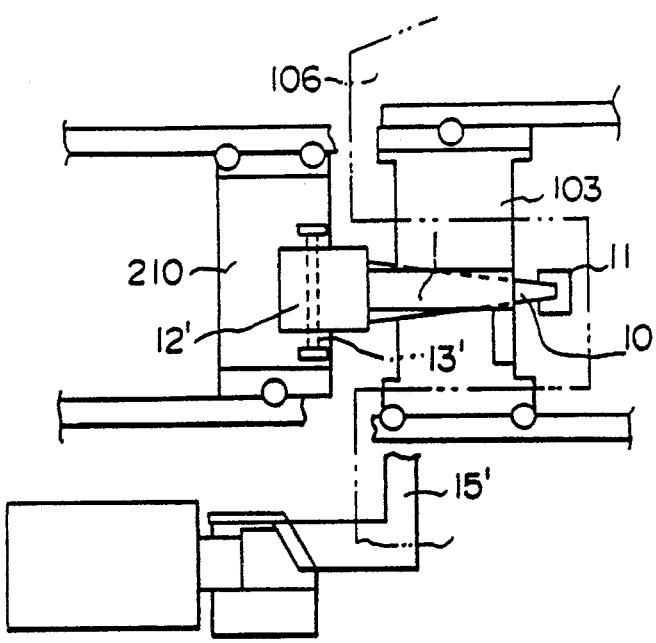
FIG. 5A is a plan view showing the structure of a second preferred embodiment of an optomagnetic disc apparatus according to the present invention.
Figure 5C:
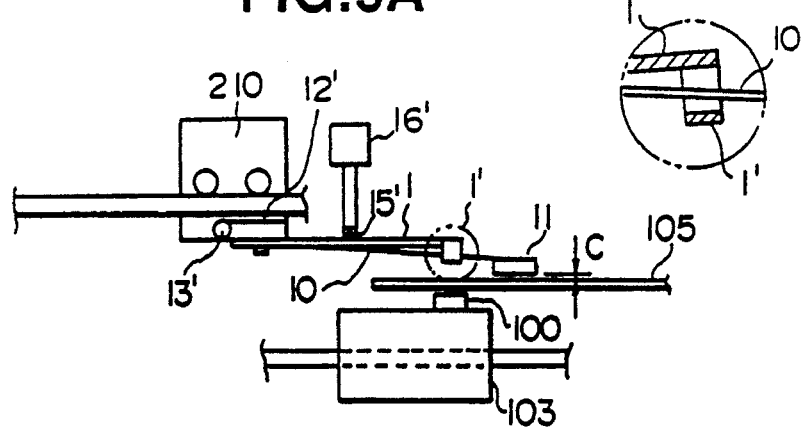
Figure 5C:
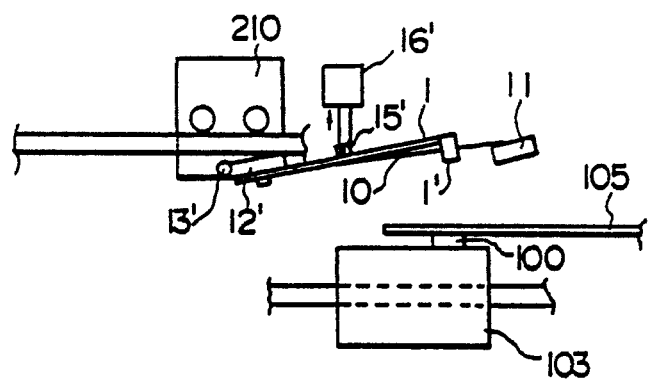

A second preferred embodiment of the present invention will be explained with reference to FIGS. 5A, 5B and 5C which are respectively a plan view and two side views of the second embodiment. In the second embodiment, an optical pick-up 100 and a magnetic head 11 are respectively carried by separate head carriages 103 and 210, and the seek operation is performed by moving the carriages 103 and 210 synchronously. The same members or portions as those in the preceding Figures are designated by the same reference numerals. In this embodiment, a preload or limiting member 1 is pivotally supported by an intermediate member 12' using a shaft 13' and is spring-forced towards the retreat position by a torsion spring (not shown). Therefore, the limiting member 1 is always pushed against a lift arm 15'.

The limiting member 1 has a hooked portion 1' at its free end. Therefore, when the limiting member 1 is moved away from disc 105, the leaf spring 10 becomes engaged with the hooked portion 1' and is also retreated. As a result, when the magnetic head 11 is in the retreated position /the state in which the lift arm 15' is moved upward as shown in FIG. 5C), the hooked portion 1' of the limiting member 1 functions to push up the leaf spring 10 towards the retreat position and thus the deflection of the leaf spring 10 is limited.

When the disc 105 is rotated (the state in which the lift arm 15' is moved downward as shown in FIG. 5B and the magnetic head 11 is floated due to the air flow), the limiting member 1 is pushed against the lift arm 15' by the reaction of the torsion spring and is brought into a non-contact state with respect to the leaf spring 10, as shown in FIG. 5B. Thus, the stroke amount of the retreating means such as the lift arm 15' and a solenoid 16' can be reduced.

Figure 6A:
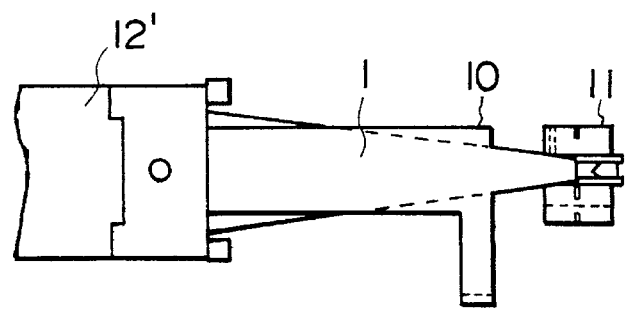
FIGS. 6A and 6B are respectively plan and side views of a modified preload or limiting member of the apparatus shown in FIG. 5.
Figure 6B:
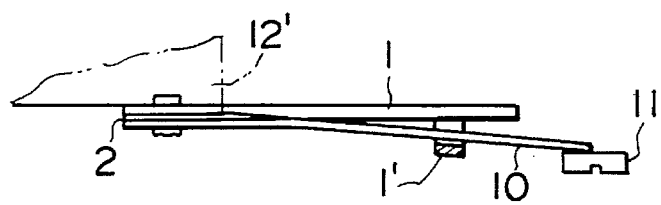
Figure 6C:
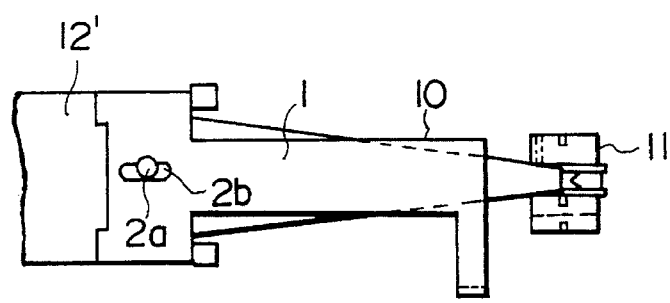
FIGS. 6C and 6D are respectively plan and side views of another modified preload or limiting member of the apparatus shown in FIG. 5.
Figure 6D:
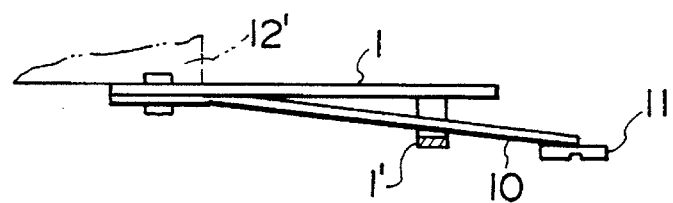
Figure 7A:
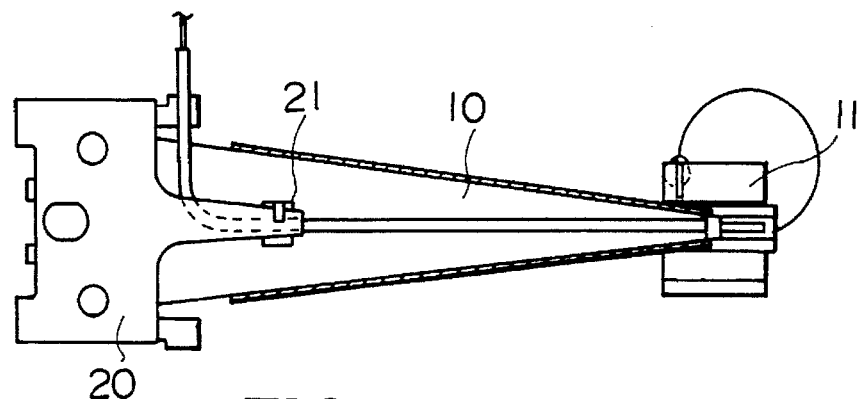
FIGS. 7A and 7B are respectively a plan and a side views view of details near a magnetic head of a third preferred embodiment of an optomagnetic apparatus of the present invention.
Figure 7B:
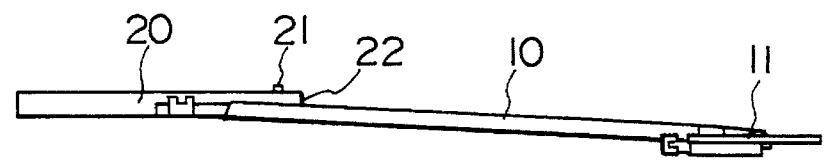

A plan and side views of a modified structure are shown in FIGS. 6A and 6B, respectively. In the modified structure, the limiting member 1' is attached to the intermediate member 12' through a spacer 2 as shown in FIG. 6B. Thus, the clearance between the leaf spring 10 and the hooked portion 1' of the limiting member 1 in the non-contact state in which the magnetic head 11 abuts the disc 105 can be adjusted. A plan and side views of a structure in which the clearance can be adjusted are shown in FIGS. 6C and 6D, respectively. The clearance may be adjusted in the following manner. Namely, an oblong hole 2a extending in the longitudinal direction is formed in the limiting member 1, a screw 2b is threaded into the oblong hole 2a and the limiting member 1 is attached to the leaf spring 10 in an adjusted position in the longitudinal direction as shown in FIG. 6C. Thus, the above-mentioned clearance can be adjusted.

A third preferred embodiment of the present invention will be described with reference to FIGS. 7A, 7B, 8A and 8B. The third embodiment differs from the first and second embodiments in that the limiting member is not disposed at the side of the disc 105 which faces the leaf spring 10.

The same members or portions as those in the preceding Figures are designated by the same reference numerals. In this embodiment, the limiting member consists of a portion of a spacer 20 which is interposed between a leaf spring 10 and an intermediate member (not shown), and a hooked portion 21 of the leaf spring 10. The spacer 20 is arranged to adjust the position of a magnetic head 11 relative to the disc surface.

The structure of the limiting member or means will be described in more detail. A portion 22 of the spacer 20 is located above the leaf spring 10 and is extended in the longitudinal direction (an extending direction of the 1ear spring 10). Opposed to the portion 22, a hooked portion 21 which may be formed by cutting and protruding is provided at a central portion on a flat upper surface of the leaf spring 10.

An upper portion of the hooked portion 21 extends substantially parallel to the flat upper surface of the leaf spring 10 and is disposed above the extended portion 22 of the spacer 20 so that the upper portion of the hooked portion 21 can engage the extended portion 22 of the spacer 20 when the magnetic head 11 is moved away from the disc 105. It is preferable to optimally determine the height and position of the hooked portion 21 and the shape of the extended portion 22 of the spacer 20 within a predetermined tolerance to allow a sufficient deflection of the leaf spring 10 when the disc 105 is being used. In the above structure, when the leaf spring 10 and the magnetic head 11 are moved by rotating the not-shown intermediate member, the hooked portion 21 and the extended portion 22 of the spacer 20 are brought into engagement with each other and the deflection of the leaf spring 10 is limited.

Figure 8A:
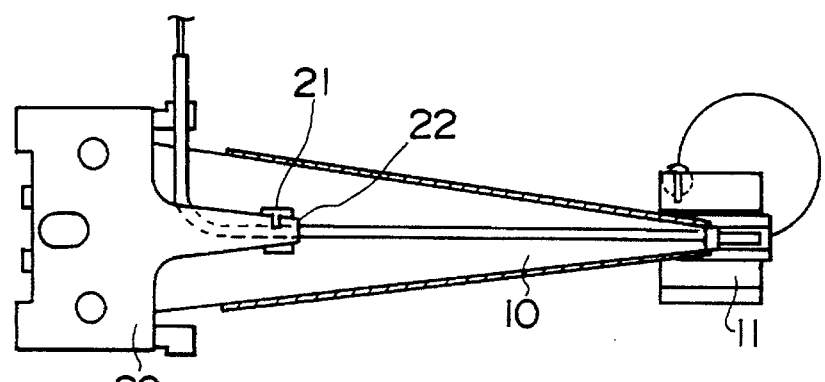
FIGS. 8A and 8B are respectively a plan and a side view of a modified preload or limiting member of the apparatus shown in FIGS. 7A and 7B.
Figure 8B:
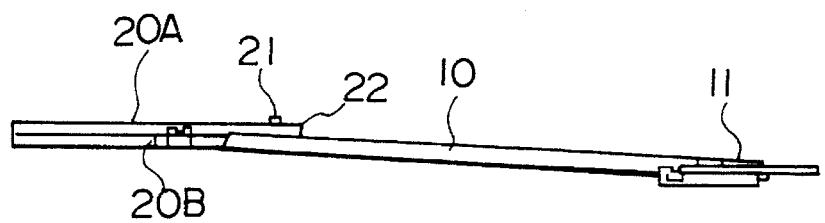

As shown in FIG. 8B, the spacer 20 may be made of upper and lower members 20A and 20B, respectively, to be able to adjust the limiting amount. That is, the deflection amount of the leaf spring 10 at the time of limiting the deflection is controlled by properly exchanging the spacer 20A, which has the extended portion 22 for engaging the hooked portion 21 of the Leaf spring 10, with another spacer.

The adjustment of the limiting amount may be achieved by a proper selection of a plate thickness of the spacer 20A, etc. Further, the adjustment of the limiting amount may also be attained by the change in the shape of the hooked portion 21 and so forth.

Figure 9A:
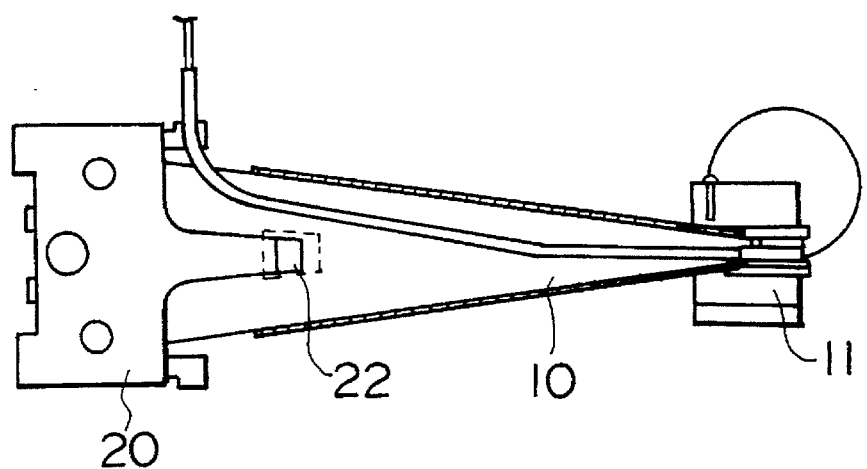
FIGS. 9A and 9B are respectively a plan and a side view of details near a magnetic head of a fourth preferred embodiment of an optomagnetic apparatus of the present invention.
Figure 9B:
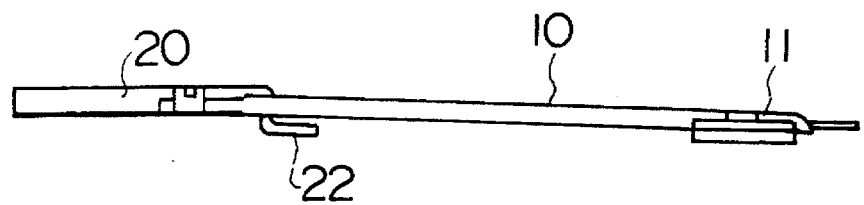

FIGS. 9A and 9 show a fourth preferred embodiment. In this embodiment, a free end portion of the extended portion 22 of the spacer 20 is curved towards the leaf spring side of spacer 20 in an L-shaped form, and this curved portion is inserted into an engagement hole formed in a flat central portion of the leaf spring 10. Further, the curved portion protrudes through the engagement hole to the lower side of the leaf spring 10, and the protruding tip portion extends along the lower side (the disc surface side) of the leaf spring 10. That is, the free end portion of the extended portion 22 of the spacer 20 is in engagement with the hole of the leaf spring 10 in a manner shown in FIGS. 9A and 9B. Thus, when the leaf spring 10 is to be moved away from disc 105, the spacer 20 is moved together with the leaf spring 10 in engagement with the leaf spring 10. As a result, the deflection of the leaf spring 10 at, the retreat time is limited. In this case, the adjustment of the preload or deflection-limiting amount can be attained by the shape of the curved portion of the spacer 20 and the location of the extended portion 22 in the engagement hole of the leaf spring 10.

As explained in the foregoing, there is provided in an optomagnetic disc apparatus of the present invention a preload member for limiting a deflection of a leaf spring for holding a magnetic head in the retreated position, so that the a retreating mechanism for the magnetic head need not account for the deflection amount of the leaf spring. Therefore, the driving stroke needed for moving the magnetic head can be reduced, and as a result, only a small driving means is needed and the retreating mechanism can be made small in size.

The preload member itself of the present invention is made of material having a high rigidity which would not be deflected due to the weight of the leaf spring, the magnetic head and the preload member.

The individual components shown in outline or designated by blocks in the Drawings are all well-known in the recording apparatus arts and their specific construction and operation are not critical to the operation or best mode for carrying out the invention.

While there has been shown and described what are considered preferred embodiments of the present invention, it will be obvious to those skilled in the art that various changes and modifications may be made therein without departing from the invention as defined by the claims.

What is claimed is:

1. A magneto-optical disc apparatus for recording information on a magneto-optical recording medium using a floating type magnetic head, said apparatus comprising:

a floating type magnetic head;

a resilient member having a low spring constant for supporting said magnetic head on one end of said resilient member;

a supporting member for supporting said resilient member on the other end of said resilient member;

retreating means for moving said supporting member to retreat said magnetic head from a recording position to a non-recording position, wherein said retreating means retreats said magnetic head above the recording medium;

limiting means, fixed on one end of said supporting member, for limiting an amount of downward deflection of said resilient member caused when said retreating means retreats said magnetic head, wherein said limiting means contacts said resilient member to limit the amount of deflection of said resilient member in accordance with movement of said supporting member; and means for maintaining said limiting means apart from said resilient member and allowing relative motion between said limiting means and said resilient member when said magnetic head is in the recording position.

2. A magneto-optical disc apparatus according to claim 1, wherein said limiting means is disposed below said resilient member to limit the amount of deflection of said resilient member.

3. A magneto-optical disc apparatus according to claim 1, wherein said maintaining means, maintaining said limiting means apart from said resilient member, provides a constant distance between said floating type magnetic head and the recording medium, when said head is in the recording position.

4. A magneto-optical disc apparatus for recording information on a magneto-optical recording medium using a floating type magnetic head, said apparatus comprising:

a floating type magnetic head;

a leaf spring for floatably supporting said magnetic head above the medium;

retreating means for moving said magnetic head away from the medium;

a carriage for supporting said leaf spring;

a spacer interposed between said leaf spring and a portion of said carriage; and limiting means for limiting an amount of deflection of said leaf spring when said retreating means moves said magnetic head away from the medium, said limiting means comprising a portion of said spacer and a portion of said leaf spring, wherein the portion of said leaf spring comprises a hooked portion formed by cutting and protruding a portion of said leaf spring upwardly, and the portion of said spacer comprises an extended portion of said spacer capable of engaging with the hooked portion of said leaf spring.

5. A magneto-optical disc apparatus according to claim 4, wherein the hooked portion and the extended portion are disposed above said leaf spring.

6. An apparatus for recording information on a recording medium, said apparatus comprising:

floating type recording means;

a resilient member having a low spring constant for supporting said recording means at one end of said resilient member;

a supporting member supporting said resilient member at the other end of said resilient member;

moving means for moving said supporting member to retreat said recording means between a recording position and a non-recording position, wherein said moving means retreats said recording means above the recording medium;

limiting means, fixed on one end of said supporting member, for limiting an amount of downward deflection of said resilient member when said recording means is at the non-recording position, wherein said limiting means contacts said resilient member to limit the amount of deflection of said resilient member in accordance with movement of said supporting member; and means for maintaining said limiting means apart from said resilient member and allowing relative motion between said limiting means and said resilient member when said recording means is in the recording position.

7. An apparatus according to claim 6, wherein said limiting means comprises a member disposed beneath said support means and having a free end portion contactable with a lower surface of said support means.

8. An apparatus according to claim 7, wherein said limiting means further comprises spacing means disposed between said member and said support means for varying a position on the lower surface of said support means at which the free end portion of said member contacts said support means when said recording means is in the non-recording position.

9. An apparatus according to claim 7, wherein said limiting means further comprises screw means for attaching said member to an intermediate member and for varying a position on the lower surface of said support means at which the free end portion of said member contacts said support means when said recording means is in the non-recording position.

10. An apparatus according to claim 6, wherein said moving means comprises lifting means for lifting said limiting means, and said limiting means comprises a member having a hooked portion at a free end of the member, wherein the hooked portion engages said support means when said moving means moves said support means.

11. An apparatus according to claim 6, wherein said limiting means comprises a member disposed above said support means and having a hooked portion extending downward, wherein the hooked portion engages a bottom surface of said support means when said moving means moves said support means.

12. An apparatus according to claim 11, wherein said member is attached to an intermediate member by an attachment, means which passes through a slot in said member.

13. An apparatus according to claim 6, wherein said limiting means comprises a member disposed above a main portion of said support means and a hooked portion of said support means extending over said member, the hooked portion engaging a surface of said member when said moving means moves said support means.

14. An apparatus according to claim 6, wherein said limiting means comprises a member having a main portion disposed above said support means and having a hooked end portion extending downward through a hole in said support means, the hooked end portion engaging a bottom surface of said support means when said moving means moves said support means.

15. An apparatus according to claim 6, wherein said maintaining means, maintaining said limiting means apart from said resilient member, provides a constant distance between said floating type recording means and the recording medium, when said recording means is in the recording position.

16. An information recording apparatus for recording information on a recording medium using a floating type recording head, said apparatus comprising:

a floating type recording head;

a resilient member having a low spring constant for supporting said recording head;

retreating means, connected to said resilient member, for retreating said recording head from a recording position to a non-recording position;

limiting means, connected to said retreating means, for limiting deflection of said resilient member, said limiting means comprising an extension member extending along said resilient member and an L-shaped hook provided on one end of the extension member, said L-shaped hook being arranged to engage and lift said resilient member when said retreating means retreats said recording head to the non-recording position; and means for maintaining said L-shaped hook apart from said resilient member and allowing relative motion between said extension member and said resilient member when said recording head is in the recording position.

17. An apparatus according to claim 16, wherein said L-shaped hook is contactable with said resilient member in accordance with rotation of said retreating means to limit the amount of deflection of said resilient member.

18. An apparatus according to claim 16, wherein said extension member contacts the L-shaped hook to limit the amount of deflection of said resilient member when said retreating means rotates.

19. An information recording apparatus for recording information on a disc-shaped recording medium by using a floating type recording head, said apparatus comprising:

a carriage movable in the radial direction of said recording medium;

a rotation member rotatably supported by said carriage;

a floating type recording head;

a resilient member having a low spring constant carried by said rotation member for supporting said recording head;

retreating means for causing said rotation member to rotate, to retreat said recording head from a recording position to a non-recording position;

limiting means for limiting the amount of deflection of said resilient member caused when said recording head is retreated by said retreating means, wherein said limiting means is fixed on said rotation member and limits the amount of downward deflection of said resilient member by contacting said supporting member in accordance with rotation of said rotation member; and means for maintaining said limiting means apart from said resilient member and allowing relative motion between said limiting means and said resilient member when said recording head is in the recording position.

20. An information recording apparatus according to claim 19, wherein said limiting means is disposed below said supporting member to limit the deflection of said supporting member from the lower side of said supporting member.

21. An information recording apparatus according to claim 19, wherein said limiting means comprises an extension member above said supporting member, extending along said supporting member and a hook provided on one end of the extension member, the hook being contactable with said supporting means in accordance with rotation of said rotation member to limit the amount of deflection of said supporting member.

22. An information recording apparatus according to claim 19, wherein said supporting member has an opening and a portion of said limiting means extends downward through the opening from the upper side of said supporting member, wherein the portion of said limiting means positioned below said supporting member contacts the lower surface of said supporting member when said retreating means retreats said recording head to limit the amount of deflection of said supporting member.

23. An information recording apparatus according to claim 19, wherein said recording head comprises a magnetic head.

24. An information recording apparatus according to claim 19, wherein said maintaining means, said limiting means apart from said resilient member, provides a constant distance between said floating type recording head and the recording medium, when said recording head is in the recording position.

25. An information recording apparatus for recording information on a disk-shaped recording medium by using a floating type recording head, said apparatus comprising:

a carriage movable in the radial direction of said recording medium;

a rotation member rotatably supported by said carriage;

a floating type recording head;

a supporting member carried by said rotation member and supporting said recording head;

retreating means for causing said rotation member to rotate, to retreat said recording head from a recording position to a non-recording position; and limiting means for contacting said supporting member to limit the amount of deflection of said supporting member caused when said recording head is retreated by said retreating means, said limiting means being disposed on said rotation member and being held apart from said supporting member when said recording head is in the recording position, wherein said limiting means comprises an extension member extending along said supporting member above said supporting member, and said supporting member comprises a hooked portion, the extension member contacting the hooked portion to limit the amount of deflection of said supporting member when said rotation member rotates.

* * * * *

UNITED STATES PATENT AND TRADEMARK OFFICE
CERTIFICATE OF CORRECTION

PATENT NO. : 5,590,095
DATED : December 31, 1996
INVENTOR(S) : Masahiko CHAYA

Page 1 of 3

It is certified that error appears in the above-indentified patent and that said Letters Patent is hereby corrected as shown below:

ON THE COVER PAGE

Under item [56] "References Cited"

U.S. PATENT DOCUMENTS:

"O'Sullivan" should read --O'Sullivan et al.--.

COLUMN 1:

Line 31, "tile" should read --the--; and
Line 66, (i-e.," should read --(i.e.,--.

COLUMN 2:

Line 11, "15" should read --15.--.

COLUMN 3:

Line 42, "embodiment" should read --embodiment,--.

UNITED STATES PATENT AND TRADEMARK OFFICE
CERTIFICATE OF CORRECTION

PATENT NO. : 5,590,095
DATED : December 31, 1996
INVENTOR(S) : Masahiko CHAYA

It is certified that error appears in the above-indentified patent and that said Letters Patent is hereby corrected as shown below:

COLUMN 4:

Line 49, "/the" should read --(the--.

COLUMN 5:

Line 1, "between-the" should read --between the--; and
Line 29, "1ear" should read --leaf--.

COLUMN 6:

Line 10, "at," should read --at--; and
Line 30, "well-known" should read --well known--.

COLUMN 8:

Line 27, "attachment," should read --attachment--.

UNITED STATES PATENT AND TRADEMARK OFFICE
CERTIFICATE OF CORRECTION

PATENT NO. : 5,590,095
DATED : December 31, 1996
INVENTOR(S) : Masahiko CHAYA

It is certified that error appears in the above-indentified patent and that said Letters Patent is hereby corrected as shown below:

COLUMN 10:

Line 15, "said" (second occurrence) should read --maintaining said--.

Signed and Sealed this

Eighth Day of July, 1997

Attest:

BRUCE LEHMAN

*Attesting Officer*        Commissioner of Patents and Trademarks